Jan. 14, 1947.   J. MacMANUS   2,414,235
FILLING APPARATUS
Filed Nov. 18, 1942   3 Sheets-Sheet 3
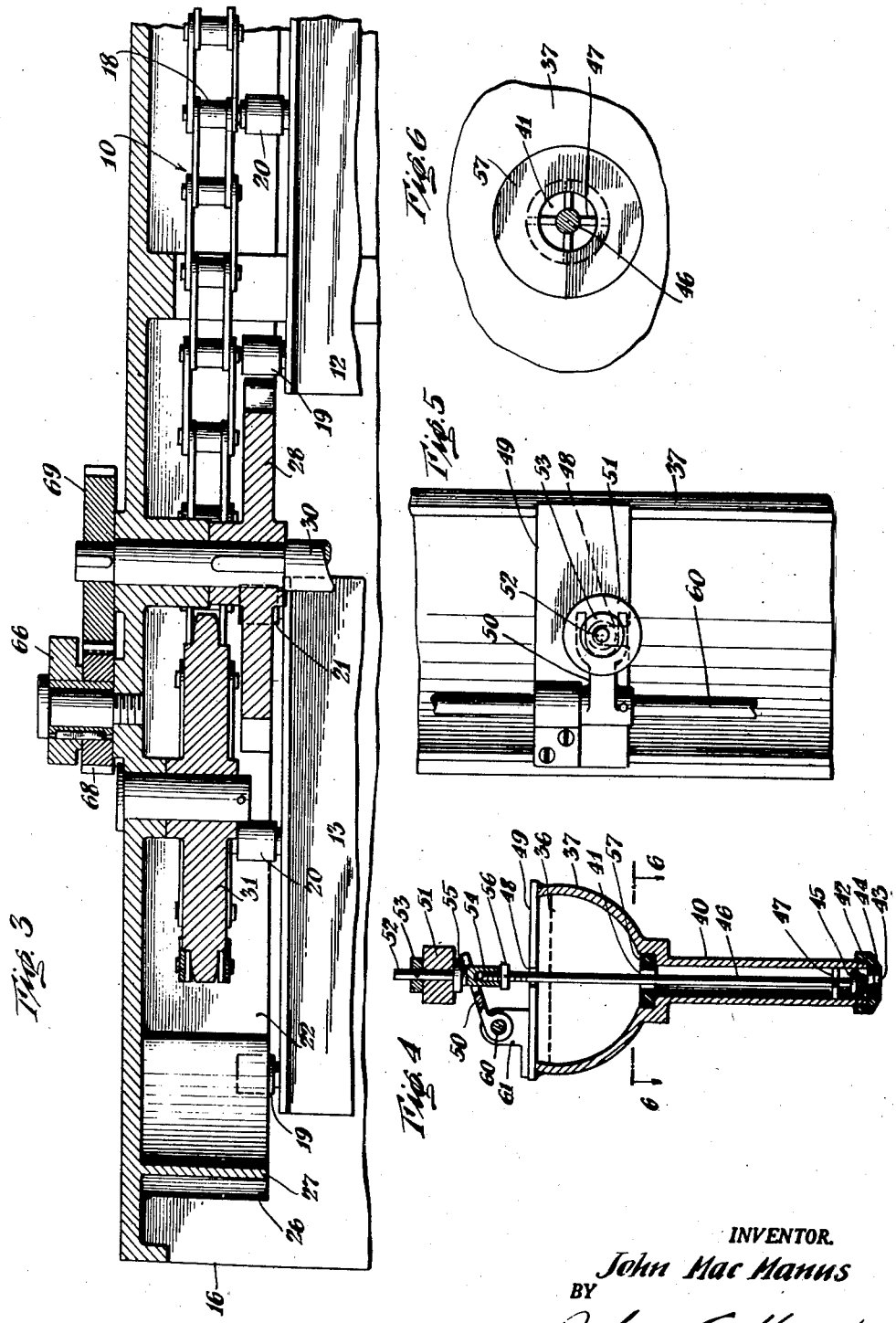
INVENTOR.
John Mac Manus
BY
John C. Kerr
ATTORNEY Patented Jan. 14, 1947

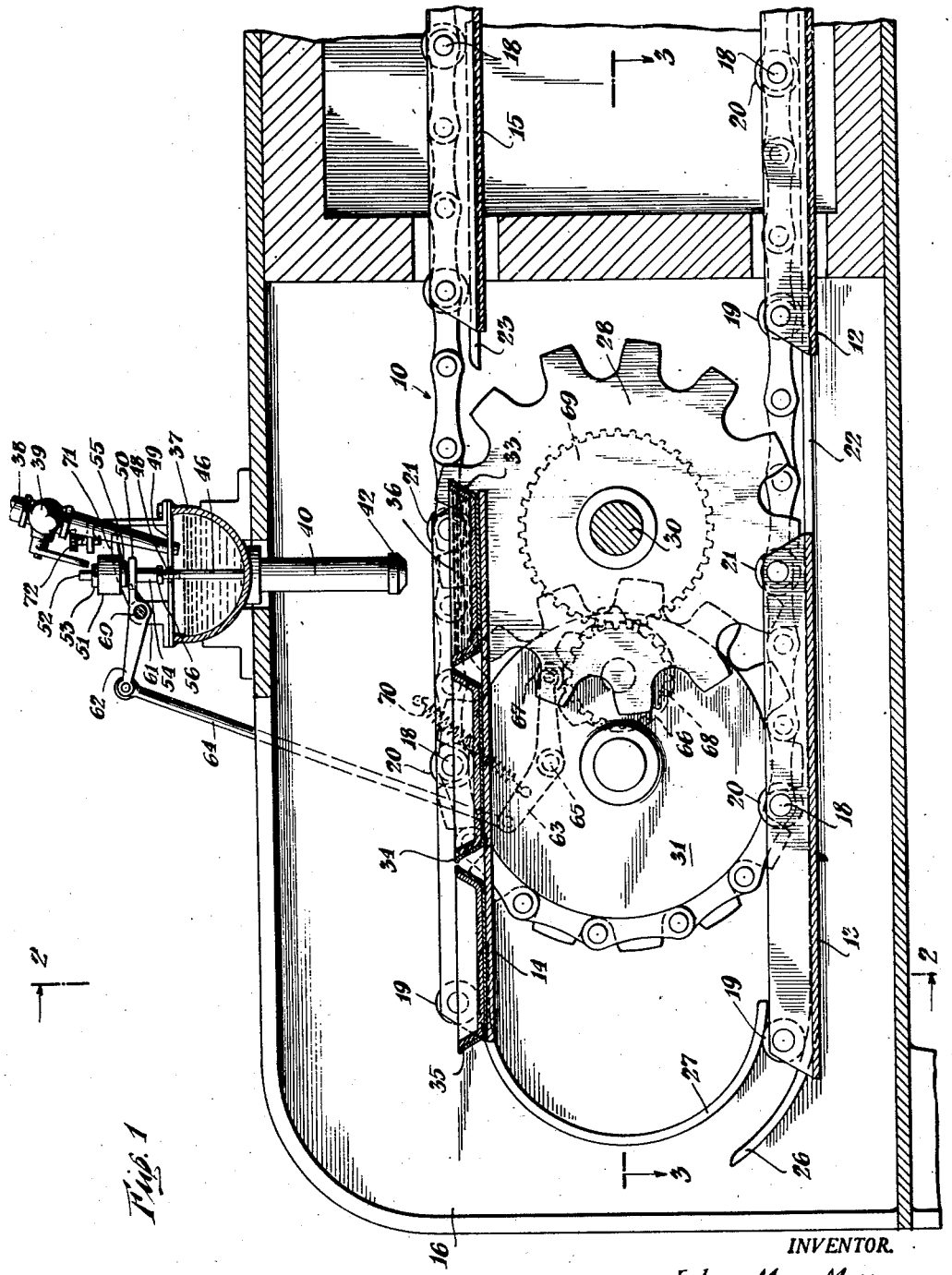

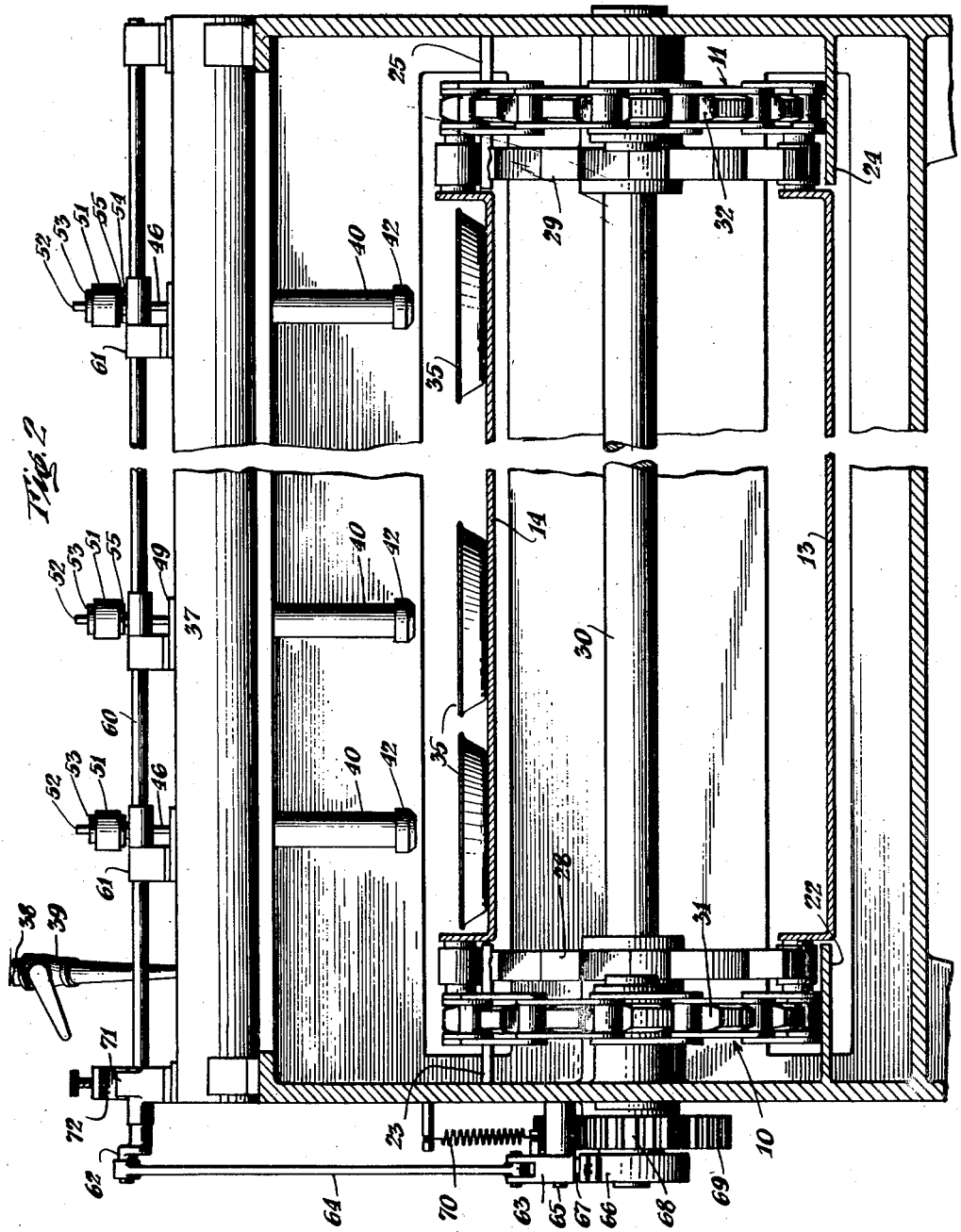

2,414,235

UNITED STATES PATENT OFFICE 2,414,235

FILLING APPARATUS

John MacManus, Yonkers, N. Y., assignor to Cushman's Sons, Inc., New York, N. Y., a corporation of New York Application November 18, 1942, Serial No. 465,981

3 Claims. (Cl. 226—99)

This invention relates to apparatus for filling pies and other containers.

Among the objects of this invention is to provide apparatus for filling pies with soft fillings and baking them.

Another object of the invention is to provide mechanism for automatically depositing fluid or other flowable material into a series of containers or serially spaced groups of containers carried by a continuously moving conveyor without interrupting the continuous passage of containers past the depositing apparatus.

Another object of the invention is to provide mechanism for depositing a measured quantity of liquid or other flowable material into a large-mouthed container or pie crust without causing splash.

Another object of the invention is to provide fluid-depositing mechanism which has provision for enabling adjustment whereby the mechanism may be used for depositing different materials having different consistencies and flow characteristics when suitable adjustment has been made for accommodating the different materials so that containers of a given volume may be filled serially and without requiring any change in the rate of passage of the containers past the filling mechanism.

Other objects will appear hereinafter in the accompanying specification and claims in which there is described the principle of the invention and the best mode in which I have contemplated applying the same.

In the drawings:

Fig. 1 is a section of a filling and baking apparatus employing the invention.

Fig. 2 is a section on line 2—2 of Fig. 1.

Fig. 3 is a section on line 3—3 of Fig. 1.

Fig. 4 is a vertical section through the depositing mechanism.

Fig. 5 is a plan of the depositing mechanism shown in Fig. 4, and

Fig. 6 is a section on line 6—6 of Fig. 4.

The portion of the oven illustrated in the drawings is at the front or loading end of a commercial baking oven wherein endless chains 10, 11 are provided for conveying a series of trays 12, 13, 14, 15, etc., in paths from the front end of the oven to its rear and back again in a continuous procession. The oven is open at its front end 16 at which pans of goods to be baked are placed upon trays and later removed therefrom after they have been exposed to the heat of the burners during their passage through the oven.

Each tray is secured to a chain at each side of the oven by means of pins 18, one located at each side edge of a tray on its mid line between its front and rear edges. Each tray is provided with three rollers 19, 20 and 21 at each side edge which cooperate with guides along the sides of the oven for keeping the trays level during their passage through the oven. As shown in Fig. 1, the rollers at one side of a tray cooperate with the horizontal guide bar 22 at one side of the oven during the passage of the trays in one direction and with the horizontal guide bar 23 when passing in the opposite direction. Similar bars 24 and 25, Fig. 2, are provided on the other side of the oven for cooperation with similar rollers at the other side edges of the trays.

At the front end of the oven, when the trays travel between the two horizontal passes, the rollers 19, one at each side edge of each tray, are engaged by pairs of arcuate guides 26 and 27 at either side of the oven. At the same time the rollers 21, at each side edge of each tray, are engaged between the teeth of toothed wheels 28 and 29, Fig. 2. The toothed wheels at the front end of the oven are mounted on a shaft 30. Only one side of the front of the oven is illustrated in Figs. 1 and 3 and it will be understood that the oven mechanism there shown is duplicated at the other side of the oven.

There also is a complete duplicate of the tray guiding mechanism previously described at the rear end of the oven (not shown) by which the trays are guided between the upper and lower passes. At the rear end of the oven rollers 19 are engaged by a pair of toothed wheels similar to toothed wheels 28 and 29, and rollers 21 travel between arcuate guides similar to guides 26 and 27.

Endless chains 10 and 11 engage with the gears 31 and 32, respectively, at the front end of the oven and with similar gears (not shown) at the rear of the oven. The drive for the conveyor may be attached to gears 31 and 32 or to their corresponding gears at the rear end of the oven.

In ordinary baking operations, the trays in the upper pass of the oven are normally caused to move towards the front of the oven and the goods to be baked are placed upon and subsequently taken from the trays as they are descending to the lower pass. In accordance with the present invention, however, the conveyor is operated in the reverse direction so that the containers for the goods to be baked are placed upon the trays as they pass from the lower pass to the upper pass at the front end of the oven. As illustrated in Fig. 1, three containers 33, 34 and 35 have been placed upon a tray 14 which is about to enter the heating zone of the oven. The first of these containers has been filled with filling material 36 by the depositing mechanism about to be described.

The depositing mechanism comprises a receptacle 37 to which a supply of filling material is introduced through a pipe line 38. This pipe line is provided with a valve 39 which may be adjusted to control the rate of flow of material to the receptacle 37. The feed of material to the receptacle is maintained constant during any given run of goods being baked. The pipe line 38 has connection with a source of supply which may be located on a floor above the baking floor and from which filling material is always available for maintaining the receptacle 37 sufficiently full at all times for assuring that there will be no interruptions of the succeeding filling and baking operations. These operations are continuous with the travel of the conveyor.

Receptacle 37 is in the form of a trough extending entirely across the oven so as to provide a plurality of individual chambers 40 from which filling material may be simultaneously deposited into a plurality of containers positioned across the oven (Fig. 2). The number of chambers is dependent upon the size of the oven and the number of containers to be filled at one time.

Each chamber 40 is in the form of a tube which has a capacity for containing approximately the quantity of material to be deposited. The entrance to the chamber is in open communication with the receptacle 37 through a restricted orifice 41, Fig. 4. The lower end of the tube is provided with a collar 42 having a discharge opening 43 and a valve seat 44. A valve 45 normally rests upon the valve seat 44 and seals against the passage of material from within the chamber.

Valve 45 is mounted upon the lower end of a rod 46. This valve rod has near its lower end a spider 47 by which the valve is guided centrally of the tube during translation.

The valve rod has its upper end restricted against displacement laterally of receptacle 37 by the edges of a notch 48 in a fixed bar 49. The rod is held within the notch by the arms of its associated yoke 50 by which the valve is actuated.

The valve is restored to its closed position and maintained in sealing relationship with its valve seat 44 principally by means of a weight 51 which is fastened to a spindle 52 by means of a fixed washer 53. The lower end of the spindle is enlarged and forms a boss 54 having a threaded bore for receiving the upper end of the valve rod. The threaded connection between the boss and valve rod enables adjustment of the distance between flange 55 and valve 45.

The duration of time of displacement of the valve from its seat is a factor which affects the amount of filling material deposited into each container. The period during which a valve is kept open is adjustable for each depositing mechanism. This is done by rotating the internally threaded boss 54 on the valve stem. This adjustment has the effect of providing any desired amount of lost-motion between flange 55 and yoke 50. When the desired adjustment is obtained it can be maintained by tightening lock nut 56.

It is important to avoid splashing of material as it strikes the containers on the trays. In filling pies, for example, since the area of the pie plate is relatively large, there is a tendency for the material to splash as it strikes the bottom of the pan or run over the edges of the pan if the rate of flow is too great. Because of the supply of material always present in receptacle 37, there would be a tendency to a too rapid expulsion of material from within chamber 40 if provision were not made for restricting the flow of material from the receptacle to the chamber. The amount of restriction desired is dependent upon the fluid characteristics of the material. When relatively fluid materials are being deposited, such as custard filling, a greater restriction is required than when a material of heavier consistency, such as pumpkin pie filling, is being poured.

The desired restriction between the receptacle 37 and the chamber 40 is attained by a perforated washer 57 which fits snugly against the inner surface of the upper opening of the chamber and provides a restricted orifice 41 at its center. Inasmuch as the valve rod 46 passes through this perforation, the orifice between the receptacle and the chamber is the annular space defined by the rod and the washer. The washer may be made of rubber or any suitable material. The washers are readily removable for cleaning and for substitution to provide different sizes of openings when runs of different materials are to be made.

The operation of the depositing mechanism is synchronized to function with the movement of the conveyor and the progress of the individual trays as they pass the discharge ends of the chambers 40. To accomplish the timely discharge of material all yokes 50 are lifted simultaneously. Each yoke is affixed to rocker shaft 60 which is supported by a number of bearings 61, conveniently mounted upon and distributed along the trough-like receptacle 37.

For actuating shaft 60 a lever 62 is provided at one of its ends, Figs. 1 and 2. This lever is connected to bell crank 63 by means of a link 64. The bell crank is oscillated about its pivot 65 by a cam 66 which cooperates with a follower 67.

The cam is fixed to a gear 68 which meshes with a gear 69 and is driven thereby. Gear 69 is carried by shaft 30, and consequently turns in unison therewith as the conveyor moves.

In the arrangement shown the follower is maintained in contact with the cam by a spring 70 which has sufficient tension to offset the weight of link 64. An advantage of this arrangement is that rocker shaft 60 can be operated to raise the valves by simply bearing downwardly on the end of lever 62 whenever it might appear desirable to do so. For limiting the rocking movement of shaft 60 when it is manually operated and arm 71 and an adjustable stop 72 are provided, Figs. 1 and 2, but this stop is dispensable when the shaft is operated by a cam or by other comparable mechanism, as preferred.

In the present instance cam 66 is provided with three elevated portions in the cam track by which three successive voidings of chamber 40 are accomplished to fill three pans on each tray. The grouping of the three elevations on the cam is occasioned because of the grouping of three containers per tray and the interval between successive groups of containers passing the filling apparatus. As illustrated in Fig. 1, the first elevation has already caused the filling of the first container 33. The disposition of elevations and the gear ratio used for the cam-driving gears are determined in accordance with the number of fillings to be made during the passage of a single tray.

Each elevation controls the period of opening of valve 45 and it is to be understood that cams having different timing can be employed for attaining any number of openings of the valves per tray (in accordance with the number of containers on a tray) and for attaining different periods of elapsed time for each opening to provide for pouring watery fillings and relatively viscous fillings. In any case, however, refinement in the duration of opening of each individual valve may be attained by varying the amount of clearance between yoke 50 and flange 55 when the follower 67 rests on a low portion of the cam and the valves are closed, as explained hereinbefore.

What is claimed is:

1. In combination, an endless conveyor for carrying containers to be filled, a trough for containing liquid filling material, said trough being disposed above said conveyor and extending transversely thereof, a plurality of chambers individually connected with said trough and each chamber having such capacity as to hold approximately the amount of material required for a container, said chambers being constantly in open communication with said trough through restricted orifices whereby the surge of liquid material into said chambers from the trough during a filling operation is restricted, a discharge port at the lower end of each chamber and a valve for normally closing the same, mechanism common to all of the valves in said chambers for actuating all the valves, means intermediate said common actuating mechanism and said valves respectively for individually adjusting the period of time of the opening of each valve, whereby to fill containers of different sizes through said valves respectively, means for continuously driving said conveyor, and means operating in synchronism with said conveyor driving means for intermittently actuating said valve-actuating mechanism for causing discharge of liquid material from said chambers into successive containers carried by said conveyor.

2. In combination, an endless conveyor for carrying containers to be filled, a trough for containing liquid filling material, said trough being disposed above said conveyor and extending transversely thereof, a plurality of chambers individually connected with said trough and each chamber having such capacity as to hold approximately the amount of filling material required for a container, said chambers being constantly in open communication with said trough through restricted orifices whereby the surge of liquid material from the trough to the chambers during a filling operation is restricted, a discharge port at the lower end of each chamber and a valve for normally closing the same, valve-mechanism common to all of the valves in said chambers, means for continuously driving said conveyor, and means for intermittently actuating said valve-actuating mechanism to deposit liquid material from said chambers into successive containers carried by said conveyor, said conveyor-driving means and said last named means being coordinated to provide at least two unequal periods between filling operations during which said valves remain closed as the movement of the conveyor continues.

3. In combination, a receptacle for containing liquid filling material, a chamber having a constantly open conduit connection with said receptacle, means in said open conduit connection for restricting, without stopping, the flow of liquid material from said receptacle to said chamber when liquid material is being poured from said chamber during drawing off of liquid material from said chamber, a discharge port in said chamber and a valve for normally closing the same, said valve being supported on a rod extending through said receptacle, restricted orifice and chamber, means slidably supporting said rod substantially centrally of said open conduit connection, means for engaging said rod for lifting the same, said means including an adjustable lost motion connection whereby the duration of opening of said valve may be varied, a travelling conveyor for carrying containers past the discharge port of said chamber, means for continuously actuating said travelling conveyor, and means intermittently actuating said valve-lifting means for drawing off liquid material from said chamber to deposit same in successive containers on said moving conveyor.

JOHN MACMANUS.